(No Model.)
W. H. FORD.
GAS SAVING ATTACHMENT FOR GAS STOVES.
No. 436,562. Patented Sept. 16, 1890.
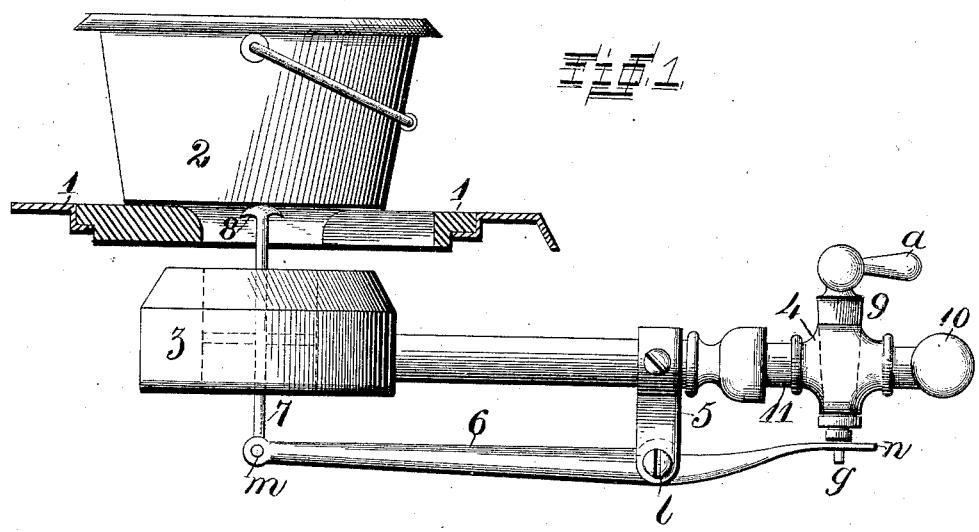
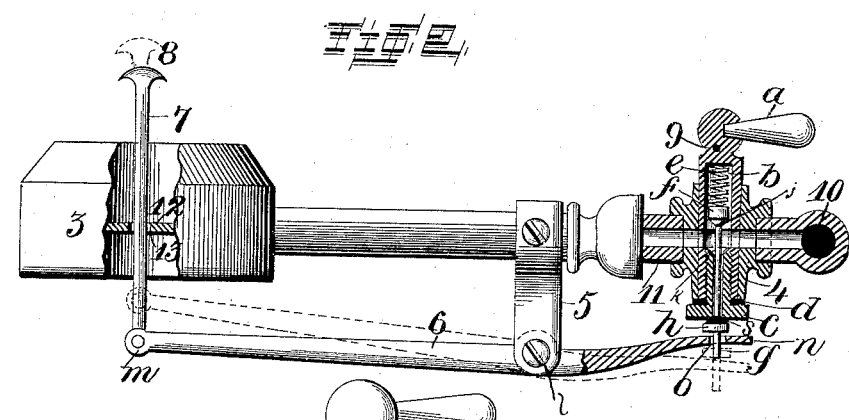
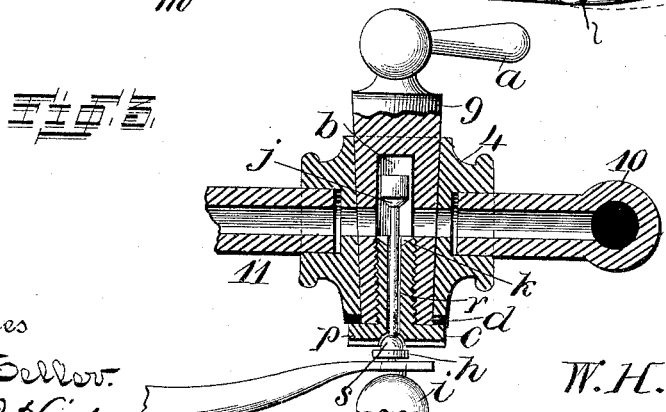
Witnesses
Inventor
W. H. Ford.
By his Attorneys
Higdon & Higdon

UNITED STATES PATENT OFFICE.

WILLIAM HUTSON FORD, OF ST. LOUIS, MISSOURI.

GAS-SAVING ATTACHMENT FOR GAS-STOVES.

SPECIFICATION forming part of Letters Patent No. 436,562, dated September 16, 1890.

Application filed May 17, 1890. Serial No. 352,192. (No model.)

*To all whom it may concern:*

Be it known that I, WILLIAM HUTSON FORD, of the city of St. Louis, in the State of Missouri, have invented certain new and useful Improvements in Gas-Saving Attachments for Gas-Stoves, of which the following is a full, clear, and exact description, reference being had to the accompanying drawings, forming a part hereof.

My invention has for its object to provide a novel and simplified construction in gas-saving attachments for gas-stoves; and it consists in the novel combination and arrangement of parts, all of which will be hereinafter more fully described, and designated in the claims.

In the drawings, Figure 1 is a side elevation of my complete invention as applied to a gas-stove. Fig. 2 is a vertical sectional view of my invention, and Fig. 3 is a vertical sectional view of a modification.

Referring to the drawings, 1 represents a grate of an ordinary gas-stove, upon which a vessel 2 is deposited, and 3 a burner such as is commonly used for this purpose.

4 represents a hand valve-casing connected with the gas-supply pipes 10 and 11, leading to the burner 3, through which valve the gas is interrupted in a greater or less degree, as will be hereinafter more fully described.

5 represents a dependent bracket, firmly clamped to the gas-supply pipe, and is constructed to receive a lever 6, which lever is fastened thereto by means of a screw or bolt $l$, allowing it sufficient movement. To one end of the lever 6 is pivoted an upright arm 7 by means of a pivot-pin $m$, said arm carrying upon its upper end a spider 8 of any configuration desired.

9 represents the turn-plug, having a handle $a$, which plug fits tightly in the valve-casing 4, but capable of being rotated therein. The plug 9 is sufficiently drilled or otherwise channeled longitudinally, as shown at $b$, to receive the working parts of my invention.

$c$ represents a screw-plug, which is screwed in the lower end of the plug 9, the shoulder $p$ of which bears against a gasket or washer $d$, which is interposed between the said shoulder and the lower end of the valve-casing 4, forming a tight connection.

$f$ represents a small valve located within the chamber $b$ of the plug 9, and is provided with a conical base $j$, which when in its lowest position lies within the conical seat $k$, formed in the top of the screw-plug $c$.

$g$ represents a stem or rod passing through an opening $r$ in the screw-plug $c$, and which is connected to the valve $f$, forming a connection therewith. A coil-spring $e$ is located within the upper part of the chamber $b$ and bears against the valve $f$, pressing the same down upon the screw-plug $c$, when pressure is released from below. A disk $h$ is secured to the lower end of the stem $g$, and is provided with a flexible or solid projection $s$, which fits a corresponding indentation formed in the lower end or base of the screw-plug $c$, which forms a tight connection at that point when the stem $g$ is in an elevated position.

The lever 6 is somewhat flattened at its free end to form a spring-blade $n$, through which blade an elongated opening $o$ is made for receiving the lower projecting end of the stem $g$, and which operates the valve $f$, as hereinafter described.

In the modification shown in Fig. 3 the spring $e$ is dispensed with, and in its place a weight $i$ is substituted and attached to the lower end of the stem $g$, which has the same result as the coiled spring previously described.

When the vessel 2 is seated upon the grate 1 of the stove, the upright rod 7 will be forced down by its weight, and in its turn raises the opposite or blade portion $n$ of the said lever, causing the valve $f$ to be raised and allow the gas to pass to the burner 3, the blade $n$ springing somewhat. When the vessel, however, is removed from the grate the lever 6 will allow the valve $f$ to fall within the passage for the inflowing gas, causing only a small quantity of gas to flow, which is accomplished by the valve $f$ being made of smaller diameter than the chamber $b$. If it be desired to entirely cut off the flow of gas, the plug 9 is turned, which operates in the usual manner. The upright rod 7 is held in an upright position by a guide 12, which guide is provided with an opening 13, through which the said rod works. This guide is preferably located within the cylindrical portion of the burner 3.

From the foregoing description it will be seen that I make use of but one valve to entirely cut off the flow of gas and to increase or diminish the same automatically.

It will be further noted that by my construction the result is accomplished in a more satisfactory manner, owing to the simplicity of construction and the durability of its parts.

Having fully described my invention, what I claim is—

1. A gas-saving attachment for gas-stoves, consisting of a suitable valve connected with the gas-supply pipe and a valve located within the said first-mentioned valve for increasing and decreasing the flow of gas automatically, substantially as described.

2. A gas-saving attachment for gas-stoves, consisting of a turn-valve connected with the gas-supply pipe, a valve located within the said valve, and a lever connecting the last-named valve for increasing and decreasing the flow of gas, substantially as described.

3. The combination, with the gas-supply pipe and burner, of the lever attached to the said pipe, a turn-valve located within the passage of the supply-pipe, and a valve located within the plug of the turn-valve and provided with a stem connected to and operated by the said lever, substantially as described.

4. A gas-saving attachment for gas-stoves, consisting of a turn-valve, a spring-valve located within the plug of the said turn-valve, a screw-plug screwed in the chamber formed in the turn-plug, a vertical stem passing through the said screw-plug and connected to the spring-valve, and a lever attached to the said stem, substantially as described.

5. A gas-saving attachment for gas-stoves, consisting of a turn-valve casing 4, having a turn-plug 9, a chamber $b$, formed in the said plug, a screw-plug $c$, screwed in the lower portion of the said chamber, a spring-valve $f$, provided with a stem $g$, a disk $h$, secured to the lower end of the said stem, and a lever 6, connected to the supply-pipe for operating the said spring-valve, substantially as described.

6. A gas-saving attachment for gas-stoves, consisting of a valve connected with the gas-supply pipe, a valve located within the said valve, and a lever having a spring-blade attached to said pipe and connected with and operating said last-mentioned valve, substantially as described.

In testimony whereof I affix my signature in presence of two witnesses.

WILLIAM HUTSON FORD.

Witnesses:
C. K. JONES,
JNO. C. HIGDON.